United States Patent
Schäfer et al.

(10) Patent No.: US 7,531,091 B2
(45) Date of Patent: May 12, 2009

(54) HOLLOW FIBER MEMBRANE FILTER WITH A SUPPORTING STRUCTURE

(75) Inventors: Stefan Schäfer, Aachen (DE); Klaus Vossenkaul, Aachen (DE); Christoph Kullmann, Eschweiler (DE)

(73) Assignee: Koch Membrane Systems GmbH, Aachen (DE)

( * ) Notice: Subject to any disclaimer, the term of this patent is extended or adjusted under 35 U.S.C. 154(b) by 379 days.

(21) Appl. No.: 10/594,879
(22) PCT Filed: Jan. 27, 2005
(86) PCT No.: PCT/EP2005/000762

§ 371 (c)(1),
(2), (4) Date: Nov. 8, 2006

(87) PCT Pub. No.: WO2005/105273

PCT Pub. Date: Nov. 10, 2005

(65) Prior Publication Data

US 2007/0246422 A1    Oct. 25, 2007

(30) Foreign Application Priority Data

Apr. 2, 2004  (DE) .................... 10 2004 017 011
Apr. 22, 2004 (DE) .................... 10 2004 020 226

(51) Int. Cl.
*B01D 63/04* (2006.01)
*B01D 61/18* (2006.01)
*B01D 61/14* (2006.01)

(52) U.S. Cl. .................... 210/321.88; 210/321.69; 210/321.87; 210/321.79; 210/321.8

(58) Field of Classification Search .................... None
See application file for complete search history.

(56) References Cited

U.S. PATENT DOCUMENTS 3,442,002 A * 5/1969 Geary, Jr. et al. ............. 29/450
4,207,192 A * 6/1980 Coplan et al. ............ 210/321.88
6,620,319 B2 * 9/2003 Behmann et al. ........ 210/321.69
7,223,340 B2 * 5/2007 Zha et al. ................ 210/321.88
2004/0035779 A1 * 2/2004 Vossenkaul et al. ...... 210/321.6
2004/0188339 A1 * 9/2004 Murkute et al. .......... 210/321.8

FOREIGN PATENT DOCUMENTS

JP          61-263605          11/1986

(Continued)

OTHER PUBLICATIONS

International Search Report.

*Primary Examiner*—Krishnan S Menon
(74) *Attorney, Agent, or Firm*—Collard & Roe, P.C.

(57) ABSTRACT

The invention relates to a membrane filter for operating while submerged, with a frame (1), which can be lowered into the liquid to be purified, and with modules (2) adjacently arranged in a row. The modules (2) each have a base element (3) with a permeate collecting chamber (4), tubes (5) for a fluid that are connected to both ends of the base element (3), and with hollow fiber membranes (6) that, with an open end, are embedded in the base element (3). The hollow fiber membranes (6) are closed at their other end and terminate inside the liquid to be purified without being fixed whereby being able to freely move. The tubes (5) are vertically oriented and, at the top, are connected to a collecting line. Fiber holding devices (7) for laterally guiding the hollow fiber membrane (6) are fastened to the tubes (5). According to the invention, the fiber holding devices (7) are provided in the form of U-shaped brackets that have a web (8) and limbs (9), which are located at the ends of the web and can be fastened to the tubes (5), and these brackets surround the hollow fiber membranes (6) of a module (2) on one side in the longitudinal direction and, due to a correspondingly large dimensioned limb length, also surround the membranes at the ends in front of the tubes (8).

8 Claims, 11 Drawing Sheets

FOREIGN PATENT DOCUMENTS

Figure 1:
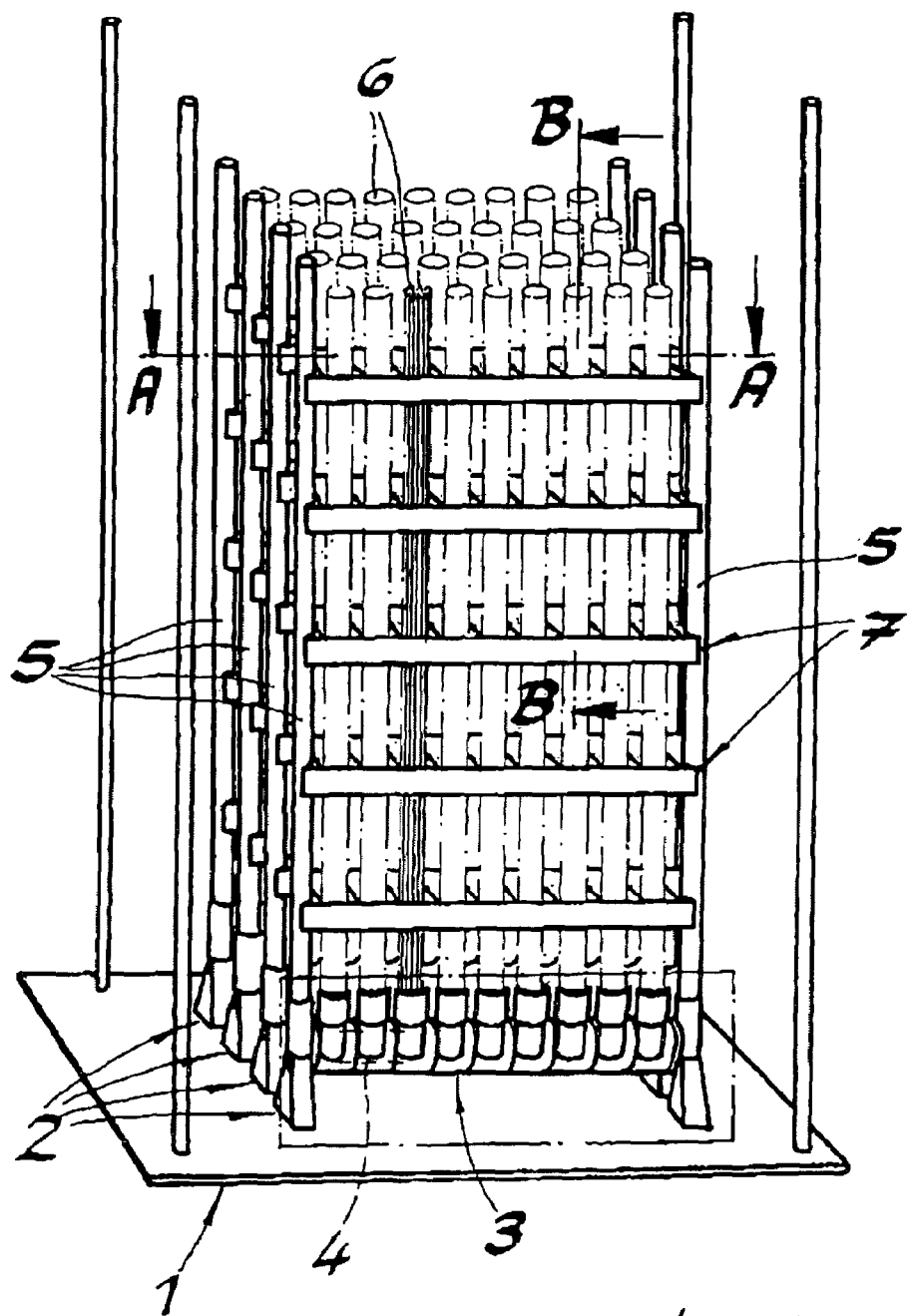

| | | |
|---|---|---|
| JP | 10-85564 | 4/1998 |
| JP | 11-342321 | 12/1999 |
| JP | 2000-84374 | 3/2000 |
| WO | WO 01/76727 | 4/2001 |

* cited by examiner

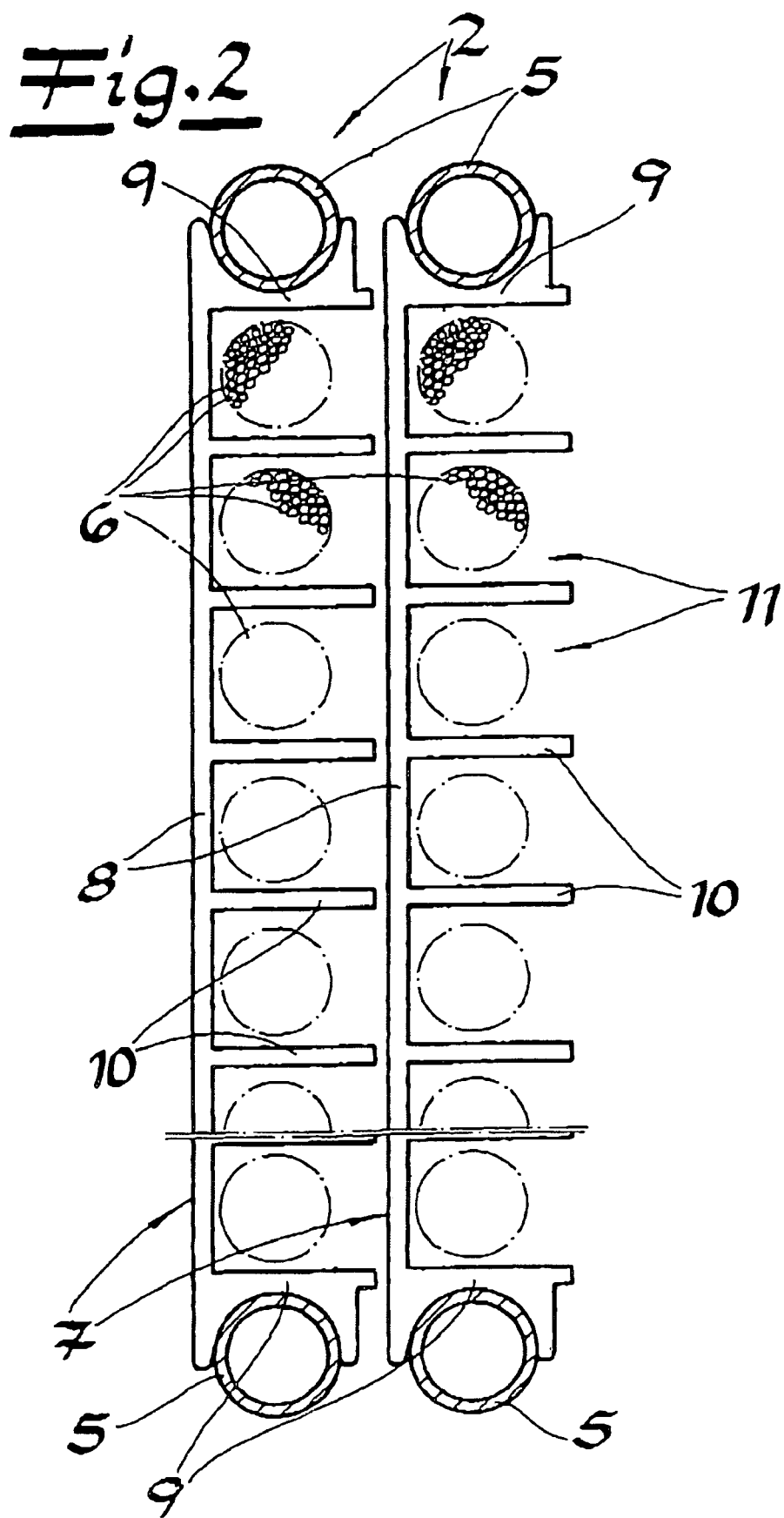

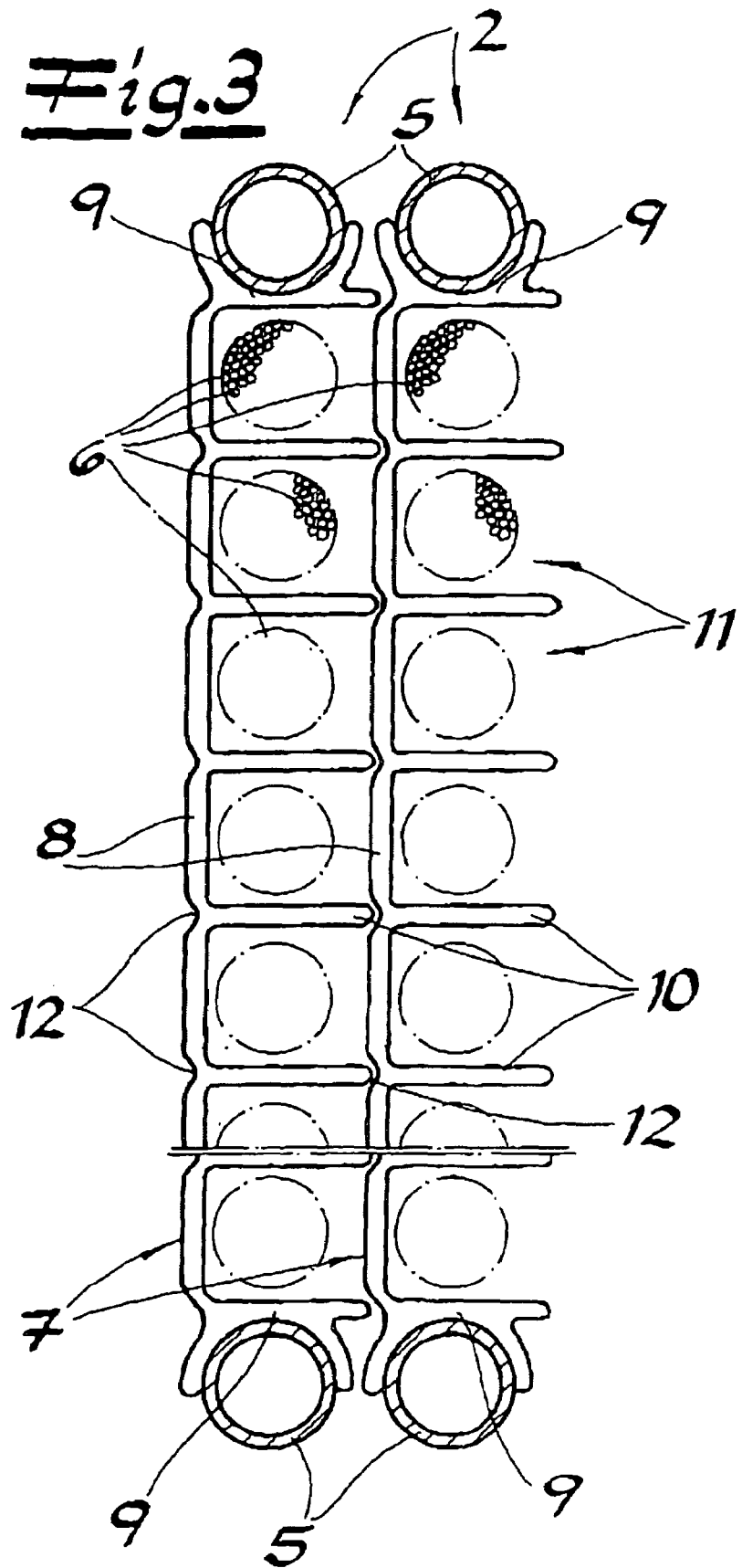

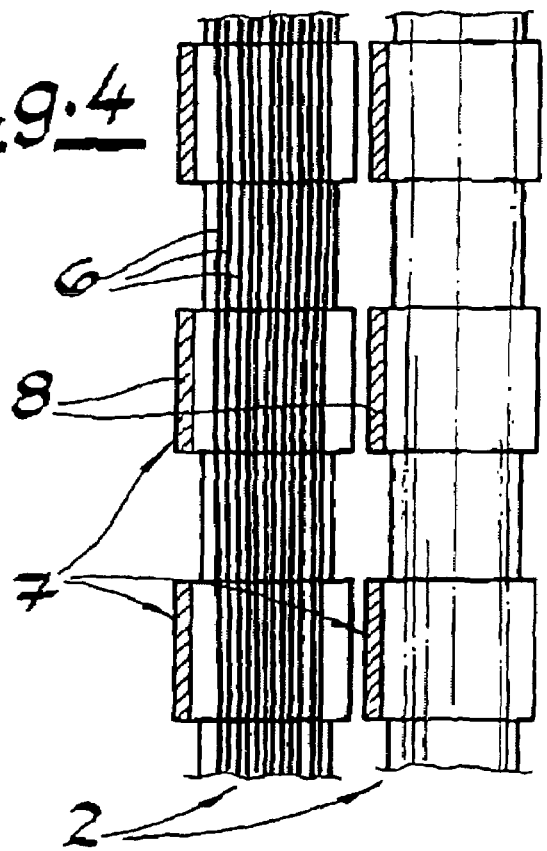
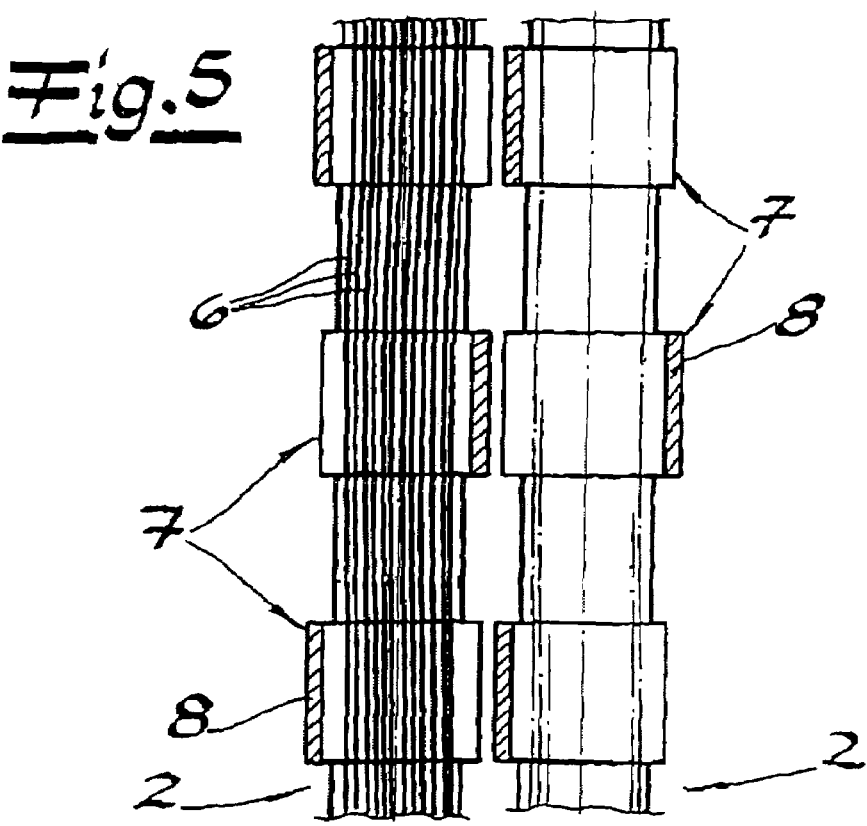

HOLLOW FIBER MEMBRANE FILTER WITH A SUPPORTING STRUCTURE

CROSS REFERENCE TO RELATED APPLICATIONS

Applicants claim priority under 35 U.S.C. §119 of German Application No.10 2004 017 011.8 filed Apr. 2, 2004, and German Application No.10 2004 020 226.5 filed Apr. 22, 2004. Applicants also claim priority under 35 U.S.C. §365 of PCT/EP2005/000762 filed on Jan. 27,2005. The international application under PCT article 21(2) was not published in English.

The invention relates to a membrane filter for submerged operation, having a frame that can be lowered into a liquid to be purified, and several modules disposed next to one another in a row, which modules each have a foot element that can be attached to the frame, with a permeate collection space, tubes for a fluid that are connected to both ends of the foot element, for example for drawing off permeate, and hollow fiber membranes cast into the foot element with an open end, whereby the hollow fiber membranes are closed off at their other end and terminate in the liquid to be purified, freely movable, without being clamped in, whereby the tubes are oriented vertically and connected with a collection line at the top, and whereby fiber holding devices are attached to the tubes for lateral guidance of the hollow fiber membranes.

Membrane filters having the characteristics described initially are known in practice. The holding devices serve to stabilize the vertically oriented hollow fiber membranes, which are freely movable in the liquid. Within the framework of the known measures, the hollow fiber membranes are surrounded by the fiber holding devices of each module, in ring shape. During affixing of the fiber holding devices to the modules, care must be taken to ensure that no part of the hollow fiber membranes is wedged in between the parts of the fiber holding devices to be connected with one another. Their assembly is therefore relatively complicated.

Fiber holding devices for a bundle of hollow fiber membranes are known from the reference WO 01/76 727 A1. The fiber holding devices are configured as cylinder-shaped cages into which the membrane fiber bundles must be pushed. The assembly effort caused by the fiber holding devices is significant. Furthermore, the cages, which are composed of many parts, are complicated in their design.

The invention is based on the task of indicating a membrane filter having the characteristics described initially, which is characterized by fiber holding devices that are simple in design and easy to assemble.

According to the invention, this task is accomplished in that the fiber holding devices are configured as U-shaped brackets that have a crosspiece as well as end-side shanks that can be attached to the tubes, and surround the hollow fiber membranes of a module on one side, in the longitudinal direction, as well as at the ends in front of the tubes, because their shank length is adapted to the broad face side of the modules. The invention is based on the recognition that the desired stabilizing effect of the fiber holding devices on the hollow fiber membranes that are freely movable in the liquid to be purified can be guaranteed even if the fiber holding devices do not surround the hollow fiber membranes in ring shape. According to the invention, the adjacent module, which is only a slight distance away, is also utilized to stabilize the hollow fiber membranes of a module. The fiber holding devices of a module surround the hollow fiber membranes only on three sides, while the adjacent module borders on the second, open longitudinal side, and assures corresponding stabilization of the hollow fiber membranes that are freely movable in the liquid. Since the brackets according to the invention are not closed off for guiding the hollow fiber membranes, assembly of the membrane filter is clearly facilitated. Furthermore, the brackets can be produced in cost-advantageous manner, for example as one-piece plastic injection-molded parts, because of their simple geometry.

Preferably, projections are formed on the crosspiece of the brackets, whereby the projections form compartments that are open on the side that lies opposite the crosspiece. In this way, a marked movement of the hollow fiber membranes along the longitudinal direction of the modules is effectively prevented. The crosspieces of the brackets can have a profile with depressions, whereby the projections of the brackets attached to an adjacent module, which projections form compartments, project all the way into the depressions. In this connection, wedging of the hollow fiber membranes can be reliably avoided by means of a suitable geometry. Preferably, the crosspieces have projecting profiles on their side that faces away from the projections, which profiles serve as baffles and keep the hollow fiber membranes away from the end regions of the projections of the adjacent bracket on this side.

A plurality of practical embodiments exists for the arrangement of the fiber holding devices. The modules can have several brackets disposed at a distance from one another, whereby the crosspieces of the brackets are disposed in a row, one on top of the other. Depending on the case of use, however, it can be practical, as an alternative to this, to dispose the brackets alternately offset in a mirror image to one another. The brackets of adjacent modules can be disposed at the same height or with a height offset. Furthermore, the brackets of adjacent modules can be attached to the related tubes with the same orientation of their shanks. As an alternative to this, however, an arrangement of the brackets of adjacent modules offset in a mirror image to one another is also possible.

It lies within the scope of the invention that the foot element of the modules is composed of several base elements that are the same and two head pieces, whereby a bundle of hollow fiber membranes is cast into each base element. The permeate space of the base elements has an opening for connecting another base element and a head piece, at two opposite sides, so that the permeate spaces connected with one another at the connection openings form the permeate collection space of the module. The tubes of the module serve for removal of the permeate and can be connected with the head pieces. The modular construction described also facilitates production of the membrane filter. In order to prevent the hollow fiber membranes, which are freely movable at one end, from falling out of the fiber holding device during assembly, disassembly, or cleaning of the modules, these steps can be carried out overhead, if necessary, with the free fiber ends hanging downward.

Figure 8:
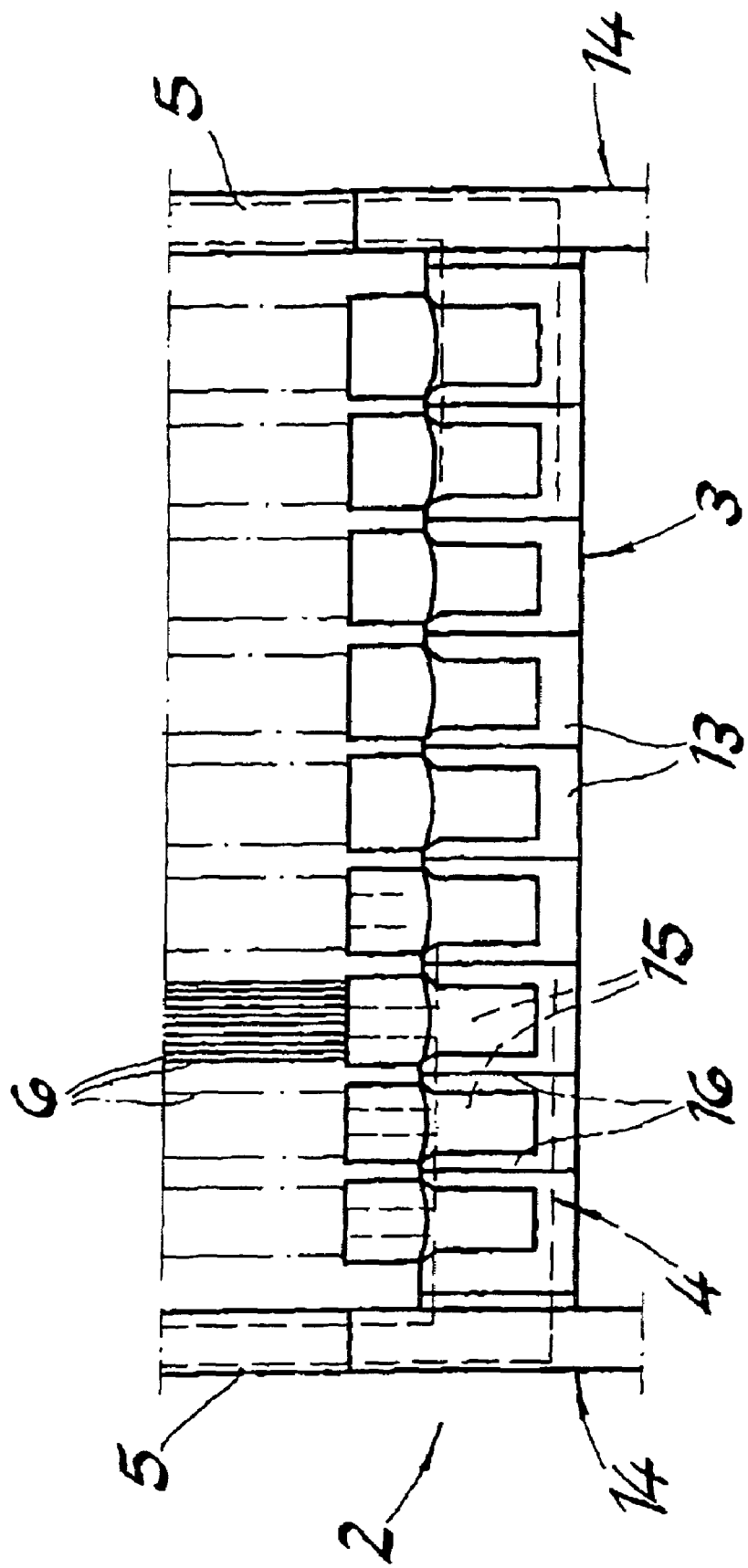
Figure 9:
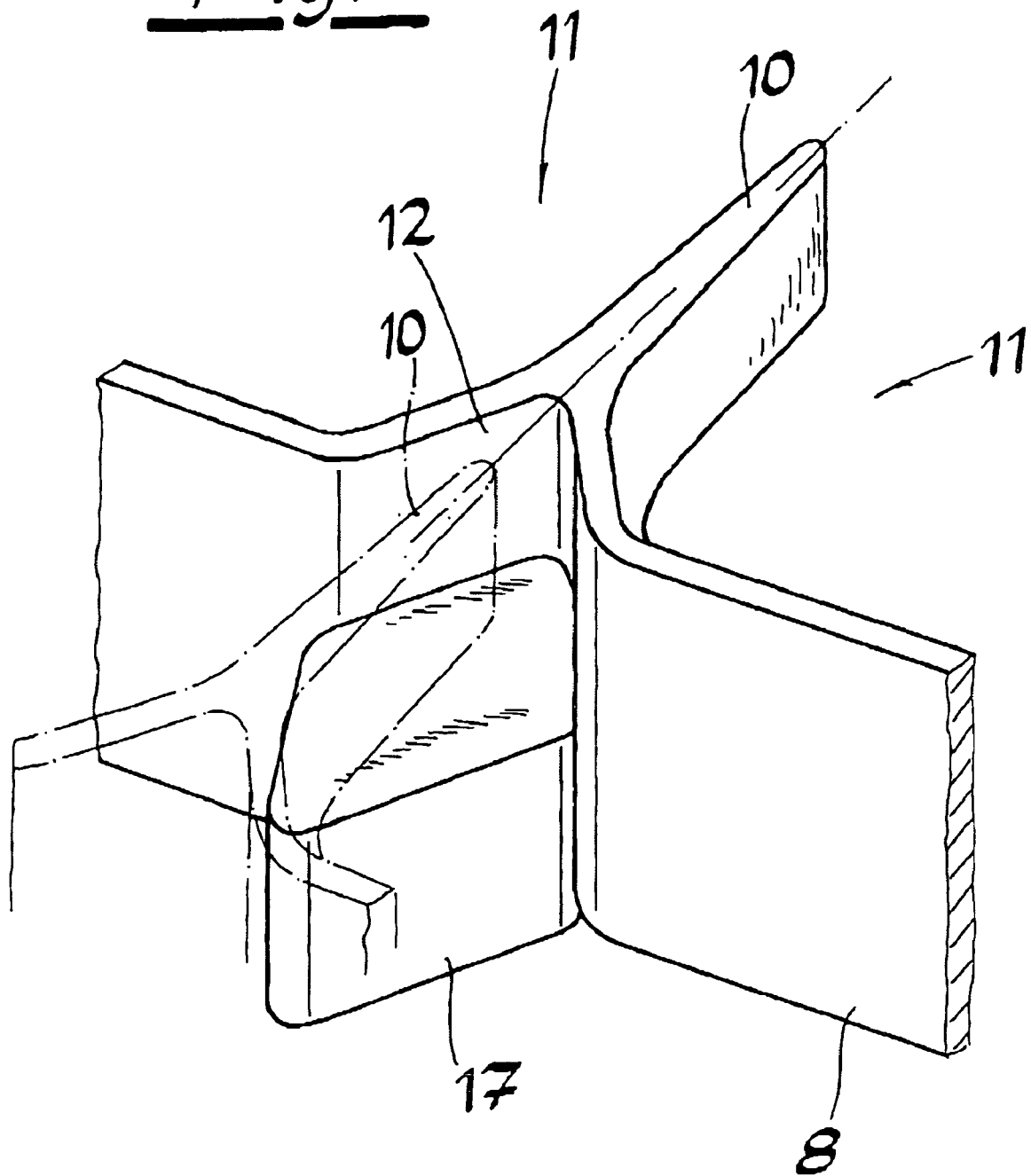
Figure 10:
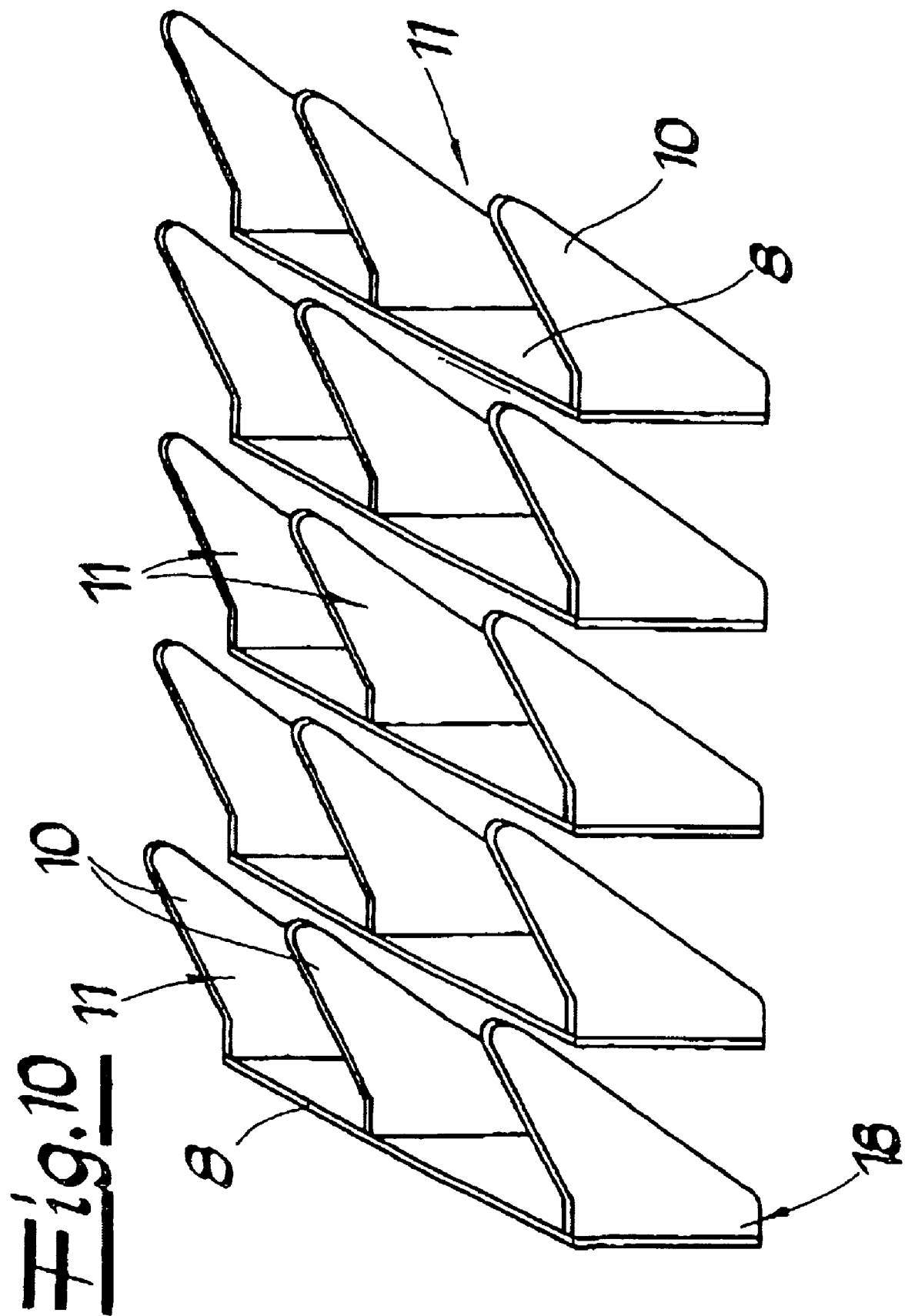
Figure 11:
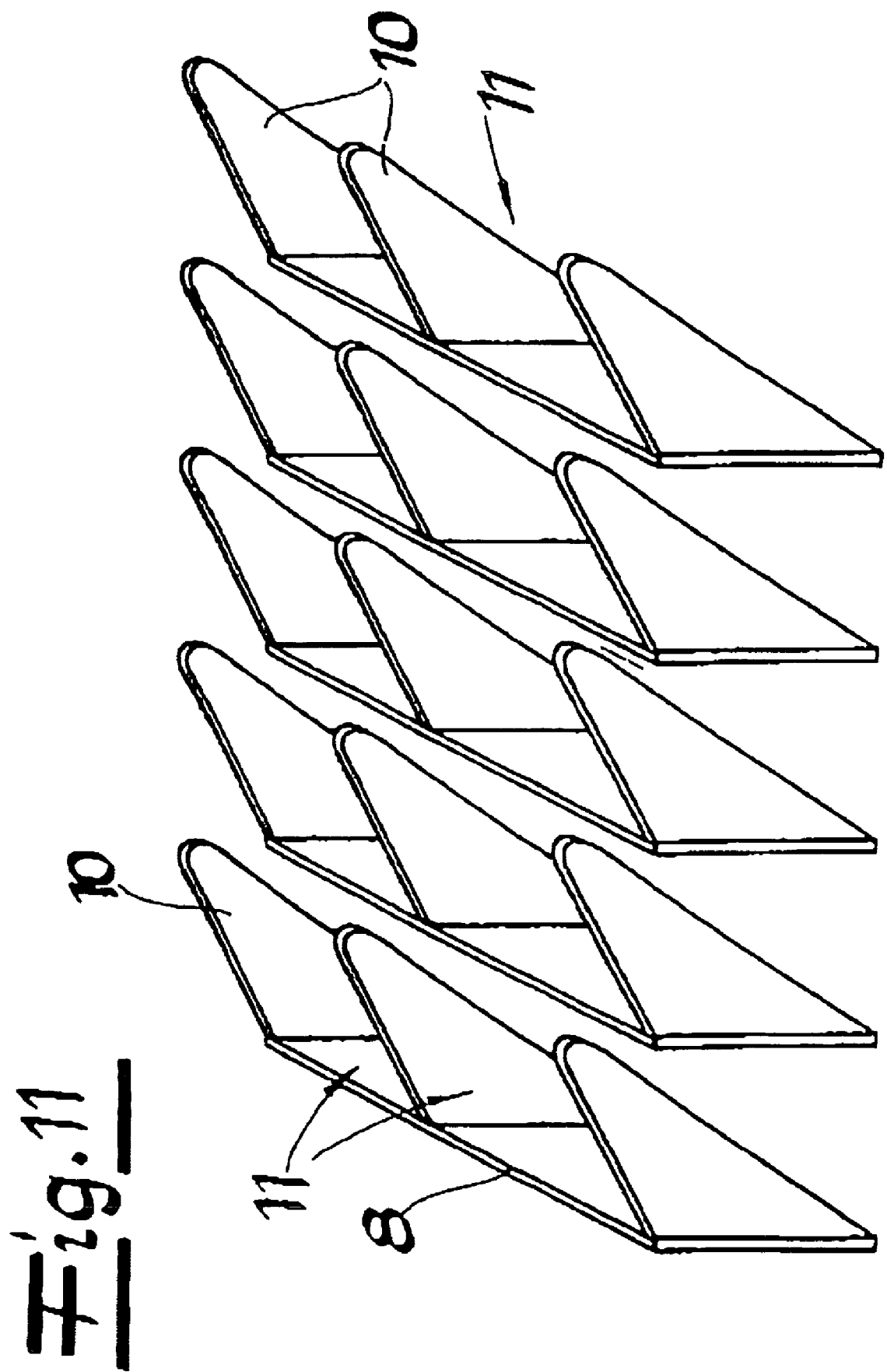

In the following, the invention will be explained in detail using a drawing that shows an embodiment merely as an example. The figures schematically show:

FIG. 1 a three-dimensional representation of a membrane filter according to the invention, FIG. 2 a representation of the section A-A in FIG. 1, as a detail, FIG. 3 another embodiment of the invention, in accordance with the representation in FIG. 2, FIG. 4 a representation of the section B-B in FIG. 1, as a detail, FIG. 5, 6, 7 other embodiments of the invention, in accordance with the representation in FIG. 4, FIG. 8 an enlarged representation of FIG. 1, as a detail, and FIG. 9 to 12 other embodiments of the invention in a three-dimensional representation, as a detail, and FIG. 13*a-e* the embodiments shown in FIG. 10 and 11 as well as other embodiments, in a representation that corresponds to FIG. 4.

FIG. 1 shows a three-dimensional representation of a membrane filter for submerged operation, with a frame 1 that can be lowered into a liquid to be purified, and several modules 2 that are disposed next to one another, in a row. The modules 2 each have a foot element 3 that can be attached to the frame 1, with a permeate collection space 4, tubes 5 for a fluid that are connected to both ends of the foot element 3, and hollow fiber membranes 6 cast into the foot element 3 with an open end. In the exemplary embodiment, the tubes 5 serve to draw off permeate. Alternatively, however, the tubes 5 can also be used to supply or remove aeration air or purification liquid. The hollow fiber membranes 6 are closed off at their other end and terminate in the liquid to be purified, freely movable, without being clamped in. The permeate tubes 5 are oriented vertically and connected with a collection line, not shown, at the top. Fiber holding devices 7 are attached to the permeate tubes 5 for lateral guidance of the hollow fiber membranes. It can be seen in FIG. 2 and 3, in particular, that the fiber holding devices 7 are configured as U-shaped brackets, which have a crosspiece 8 as well as end-side shanks 9 that can be attached to the permeate tubes 5, and surround the hollow fiber membranes 6 of a module 2 on one side, in the longitudinal direction, as well as at the ends in front of the permeate tubes 5, because their shank length is adapted to the face side of the module. Projections 10 are formed onto the crosspiece 8 of the brackets 7, whereby the projections 10 form compartments 11 that are open on the side that lies opposite the crosspiece 8. In the exemplary embodiment according to FIG. 3, the crosspieces 8 of the brackets 7 have a profile with depressions 12, whereby the projections 10 that form the compartments 11, of the brackets 7 attached to an adjacent module 2, project all the way into the depressions 12.

Figure 6:
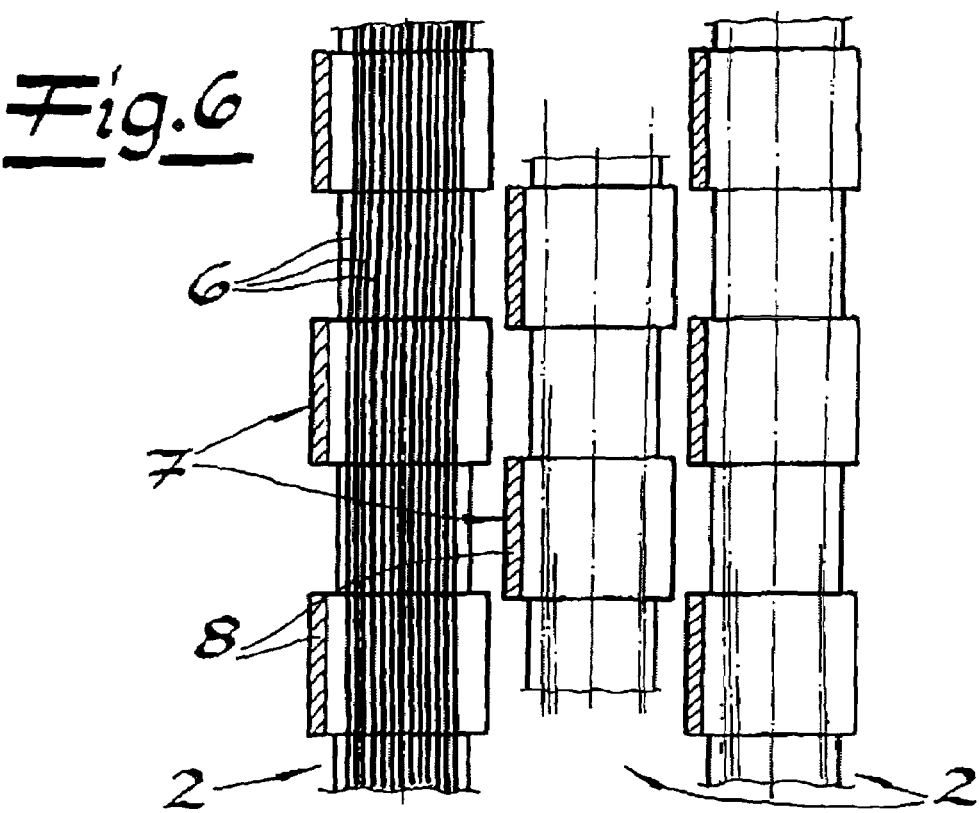
Figure 7:
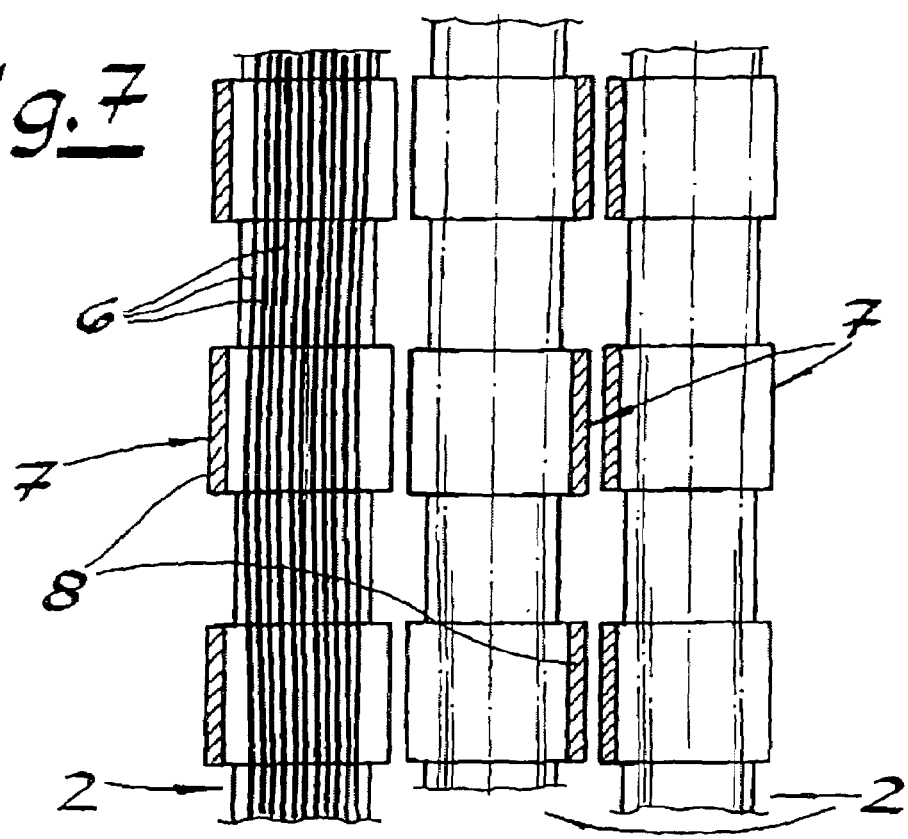

It can be seen in FIG. 4 that the modules have several brackets 7 disposed at a distance from one another as fiber holding devices, in each instance, whereby the crosspieces 8 of the brackets 7 are disposed in a row, above one another. The brackets 7 of adjacent modules 2 are disposed at the same height, and attached to the assigned permeate tubes 5 with the same orientation of their shanks 9. In FIG. 5, the brackets 7 of an individual module 2 are disposed alternately offset in a mirror image to one another. In the exemplary embodiment according to FIG. 6, the brackets 7 of adjacent modules 2 are disposed offset in height relative to one another, and in FIG. 7 they are disposed offset in a mirror image to one another.

FIG. 8 shows that the foot element 3 of the modules 2 is composed of several base elements 13 that are the same and two head pieces 14, whereby a bundle of hollow fiber membranes 6 is cast into each base element 13. The permeate space 15 of the base elements 13 has an opening 16 for connecting another base element 13 or a head piece 14 on two opposite sides. The permeate spaces 15, which are connected with one another at the connection openings 16, form the permeate collection space 4 of the module 2. The permeate tubes 5 of the module 2 are connected to the head pieces 14.

FIG. 9, in analogy to FIG. 3, shows a crosspiece 8 with projections 10 formed on and depressions 12, whereby the projections 10 that form the compartments 11, of the brackets attached to an adjacent module 2, project all the way into the depressions 12. On their side facing away from the projections 10, the crosspieces 8 have profiles 17 that serve as baffles and keeps the hollow fiber membranes 6 away from the end regions of the projections 10 of the adjacent bracket 7 on this side. The profiles 17 are configured in diamond shape in the exemplary embodiment, and extend approximately over half the height of the crosspiece 8. Above the profiles 17, there are the depressions 12, into which the projections 10 of the adjacent bracket 7 project; these projections are correspondingly narrowed on their end side.

Figure 12:
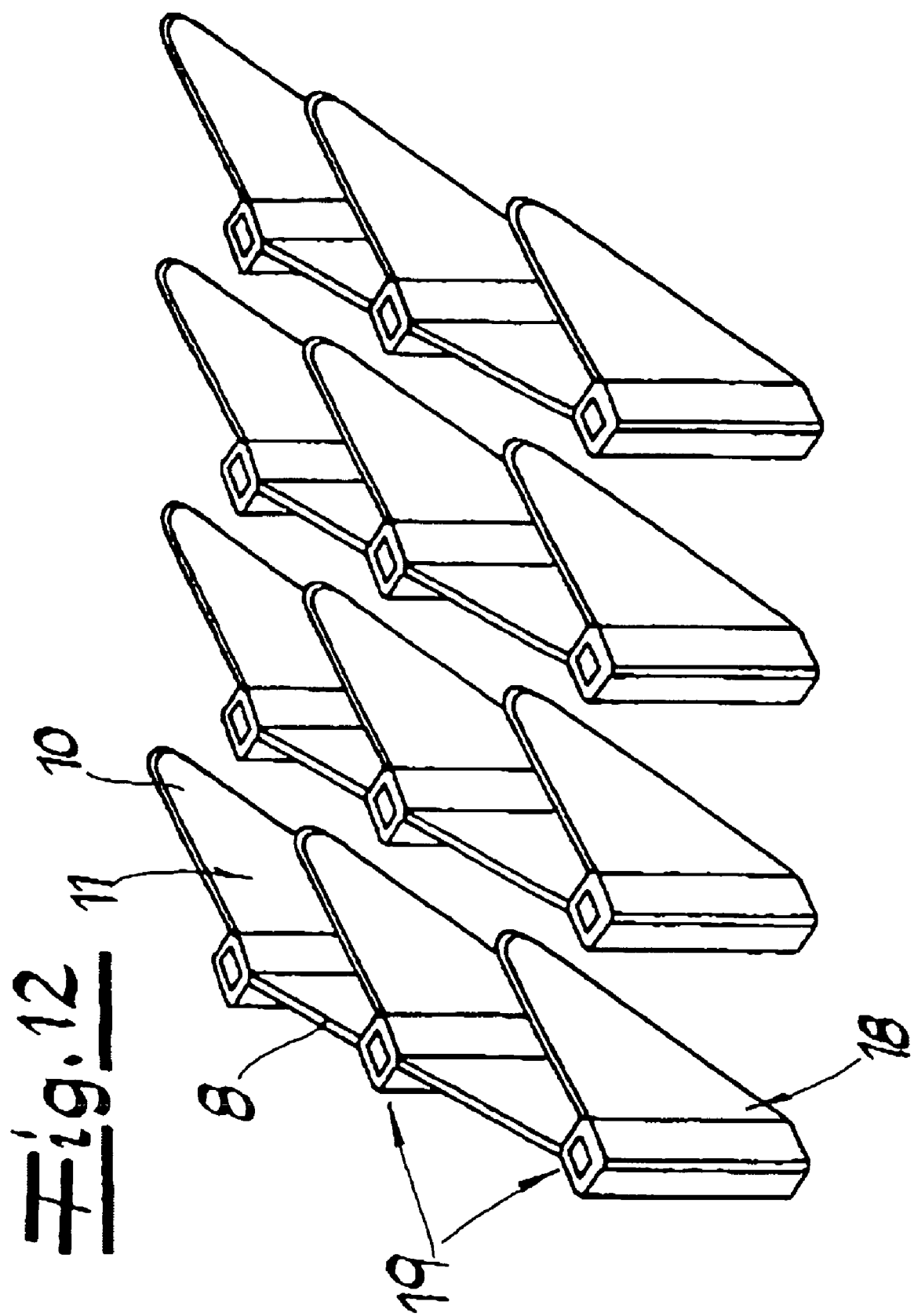
Figure 13:
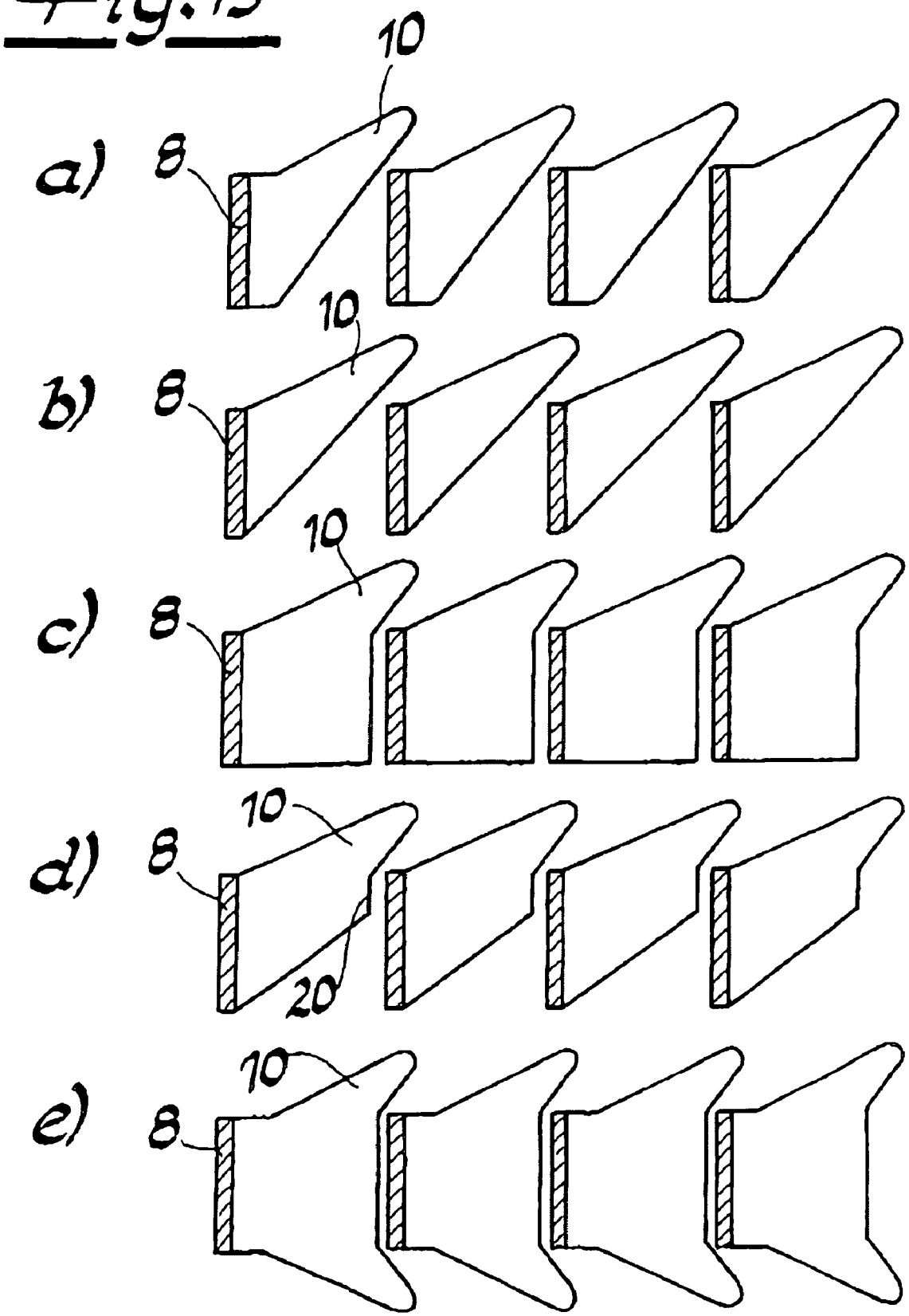

In FIG. 10 and 11, and 13*a* and 13*b*, respectively, the projections 10 of the crosspieces 8 point at a slant upward, and project above the crosspiece 8 of the adjacent bracket 7, in each instance. In this way, a marked movement of the hollow fiber membrane 6 along the longitudinal direction of the modules 2 is also prevented, while simultaneously avoiding wedging of the hollow fiber membranes 6 in the region of the ends of the projections 10. In FIG. 10 and 13*a*, the segment 18 of the projections 10 that directly follows the crosspieces 8 is oriented horizontally. In the exemplary embodiment according to FIG. 12, the connection region between the crosspiece 8 and the projections 10 formed onto it is configured as a hollow body 19, which has a square cross-sectional profile. In FIG. 12, only the lower edges of the projections 10 are oriented horizontally in the connection regions 18, while the projections 10 as a whole again point at a slant upward, and project above the corresponding crosspiece 8 of the adjacent bracket 7, in each instance. In FIG. 13*c*, only the upper region of the projections 10 points at a slant upward, while the lower region is oriented horizontally. The embodiment in FIG. 13*d*, in contrast to the representation in FIG. 13*b*, shows an additional vertical step 20, which runs parallel to the crosspiece 8 of the adjacent bracket 7. In FIG. 13*e*, the upper-side end of the projections 10 points at a slant upward, while the lower-side end is oriented at a slant downward. The two ends project above or below, respectively, the crosspiece 8 of an adjacent bracket 7, in each instance.

The invention claimed is:

1. A membrane filter for submerged operation comprising:
   (a) a frame that can be lower into a liquid to be purified;
   (b) a plurality of modules disposed next to one another in a row, each module having a foot element attached to the frame, a permeate collection space, a plurality of tubes for a fluid connected to each end of the foot element, and a plurality of hollow fiber membrane bundles cast into the foot element, the hollow fiber membranes in each hollow fiber membrane bundle having an open end in the collection space and being closed off at their other end and terminating inside the liquid to be purified without being clamped in so as to be freely movable, the tubes being oriented vertically and connected with a collection line at the top, and
   (c) a plurailiy of fiber holding devices attached to the tubes for lateral guidance of the hollow fiber membrances, the fiber holding devices comprising U-shaped brackets having a crosspiece and end-side shanks attachable to the tubes, the U-shaped bracket surrounding the hollow fiber membranes of a module on one side in the longitudinal direction and at the ends in front of the tubes due to their shank length being adapted to the face width of the modules, the crosspiece having projections and a profile with depressions, the projections forming compartments that are open on the side that lies opposite the crosspiece and that project into the depressions of the brackets of an adjacent module.

2. The membrane filter according to claim 1, wherein the crosspieces have projecting profiles on their side that faces away from the projections, which profiles serve as baffles and keep the hollow fiber membranes away from the end regions of the projections of the adjacent bracket on this side.

3. The membrane filter according to claim 1, wherein the modules have several brackets disposed at a distance from one another as fiber holding devices, the crosspieces of the brackets being disposed in a row, one on top of the other.

4. The membrane filter according to claim 1, wherein the modules have several brackets disposed at a distance from one another as fiber holding devices, the brackets being alternately offset in a mirror image to one another.

5. The membrane filter according to claim 1, wherein the brackets of adjacent modules are disposed at the same height or with a height offset.

6. The membrane filter according to claim 1, wherein the brackets of adjacent modules can be attached to the related tubes with the same orientation of their shanks.

7. The membrane filter according to claim 1, wherein the brackets of adjacent modules are offset in a mirror image to one another.

8. The membrane filter according to claim 1, wherein the foot element of the modules is composed of several base elements that are the same and two head pieces, wherein a bundle of hollow fiber membranes is cast into each base element, and wherein the permeate space of the base elements has an opening for connecting another base element or a head piece, at two opposite sides, the permeate spaces connected with one another at the connection openings forming the permeate collection space of the module, and the tubes of the module being connected with the head pieces.

* * * * *